United States Patent
Nonaka

(10) Patent No.: US 8,139,127 B2
(45) Date of Patent: Mar. 20, 2012

(54) IMAGING APPARATUS

(75) Inventor: Yuichi Nonaka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 414 days.

(21) Appl. No.: 12/418,687

(22) Filed: Apr. 6, 2009

(65) Prior Publication Data

US 2009/0251569 A1   Oct. 8, 2009

(30) Foreign Application Priority Data

Apr. 7, 2008   (JP) .................................. 2008-099407

(51) Int. Cl.
*H04N 9/73* (2006.01)
*H04N 9/64* (2006.01)

(52) U.S. Cl. ...................... 348/242; 348/224.1; 348/251

(58) Field of Classification Search ............... 348/222.1, 348/223.1, 224.1, 225.1, 241, 242, 251
See application file for complete search history.

(56) References Cited

U.S. PATENT DOCUMENTS 4,680,624 A * 7/1987 Murakami .................... 348/256
2007/0115370 A1* 5/2007 Sakamoto et al. .......... 348/222.1

FOREIGN PATENT DOCUMENTS

JP   2007-028042   2/2007

* cited by examiner

*Primary Examiner* — Daniel M Pasiewicz
(74) *Attorney, Agent, or Firm* — Kilpatrick Townsend & Stockton LLP

(57) ABSTRACT

In the imaging apparatus, an image signal derived from an imaging element is supplied to color signal producing means so as to be separated into a R(red) color signal, a G(green) color signal and a B(blue) color signal. These R, G, B signals are supplied to color-depending frequency component changing means. While predetermined information has been stored in a memory with respect to each of the R signal, the G signal and the B signal, and the predetermined information is used in order to change a signal level of a high frequency component every R, G, B signals, the color-depending frequency component changing means extracts a high frequency component from each of the R signal, the G signal and the B signal, and then, corrects frequency components of these extracted high frequency components in such a manner that the corrected frequency characteristics may constitute relevant signals.

34 Claims, 7 Drawing Sheets

IMAGING APPARATUS

INCORPORATION BY REFERENCE

The present application claims priority from Japanese application JP-2008-099407 filed on Apr. 7, 2008, the content of which is hereby incorporated by reference into this application.

BACKGROUND OF THE INVENTION

The present invention generally relates to an apparatus known as digital still cameras and video cameras. More specifically, the present invention is directed to an imaging apparatus equipped with a function capable of preventing deteriorations of image qualities.

Since there are such needs that imaging apparatuses such as digital still cameras and video cameras can be easily carried out and also can be simply operated, housings of these imaging apparatuses have been made compact. In addition to the above-described requirements, since users have made strong requests for achieving high image qualities, in particular, higher resolution of photographed images has been progressed by increasing total pixel numbers of imaging elements. However, in order to achieve photographed images having high resolution, there are very important aspects, namely, not only larger pixel numbers of imaging elements, but also, higher precision required for optical performance of lens units employed in these imaging apparatuses.

On the other hand, there are such essential points that the housings of the imaging apparatuses are necessarily required to be made compact, and also, the lens units are necessarily required to be made compact. However, it is practically very difficult to realize the high precision for the optical performance of the lens units as well as the compactnesses of the lens units at the same time. As a consequence, deteriorations in the optical performance of the lens units, which are caused by making the lens units compact, may constitute such factors that image qualities of photographed images may be deteriorated.

As one of the above-described factors as to the deteriorations in the image qualities, which are caused by the deteriorations in the optical performance of the lens units, there is such a deterioration in the optical performance, which is caused by axial chromatic aberration of the lens units.

FIG. 7 is a diagram for illustratively showing an outline as to axial chromatic aberration which occurs in a lens unit. In this drawing, reference numeral 100 shows a lens unit; symbol "O" indicates an optical axis of the lens unit 100; symbol "LI" represents incident light; symbol "LR" is red light; symbol "LB" shows blue light; symbol "dR" indicates a focal length of the red light "LR"; and symbol "dB" represents a focal length of the blue light "LB."

In this drawing, when the incident light "LI" is entered to the lens unit 100 in a parallel manner to the optical axis "O" of this lens unit 100, light passed through the lens unit 100 is collected on this optical axis "O." However, since refractive indexes of the lens unit 100 are different from each other for the respective wavelengths of the light, light collected positions on the optical axis "O" are different from each other for the respective wavelengths of the light. Accordingly, light collected positions of the red light "LR", the green light, and the blue light "LB" on the optical axis "O", which are contained in the incident light "LI", are made different from each other. As represented in this drawing, the light collected position of the red light "LR", accordingly, the focal length "dR" of this red light "LR" becomes longer than the focal length "dB" of the blue light "LB", becomes different from the light collected position of this blue light "LB." Although the green light is not illustrated in this drawing, a focal length "dG" thereof becomes "dB<dG<dR", so that this blue light is collected between the light collected position of the blue light "LB" and the light collected position of the red light "LR."

More specifically, such a difference (namely, optical-axial chromatic aberration) of the light collected positions on the optical axis "O" with respect to the respective wavelengths of the light may give an adverse influence to high frequency components of the respective R, G, B color signals. As a result, such phenomena, colors different from original colors of an image of a photographing object (namely, false colors) and chromatic blur, may occur in particular at an edge portion of a photographed color image.

FIG. 8 is explanatory diagrams for explaining false colors and chromatic blur, which occur at an edge portion of an image signal and which are caused by axial chromatic aberration of the lens unit 100.

At the edge portion of the image signal, high frequency components appear in respective color signals of this image signal. FIG. 8 represents one example as to the high frequency components of these color signals at this edge portion.

Now, in FIG. 7, in such a case that an imaging plane of an imaging element (not shown) is set at such a position where the red light "LR" is focused on the optical axis "O", namely, at the position of the focal length "dR" where the red light "LR" is collected, the lens unit 100 is just focused on a red color component of the image of the photographing object, so that a light amount characteristic of this red color component at a pixel position of an edge portion on the imaging plane of the imaging element may constitute such a characteristic of a very steep and large light amount, as represented in FIG. 8(a). In contrast to the above-described light amount characteristic, as to a blue color component of the image of the photographing object, since the imaging plane of the imaging element is shifted from the position of the focal length "dB" of the blue light "LB", the lens unit 100 is not just focused on this blue color component. Thus, as represented in FIG. 8(c), a light amount characteristic of this blue color component at the pixel position of the above-described edge portion becomes such a characteristic that a small light amount is expanded to peripheral pixels and is made flat. Also, as to a green color component of the image of the photographing object, as represented in FIG. 8(b), such an intermediate light amount characteristic between the light amount characteristic indicated in FIG. 8(a) and the light amount characteristic indicated in FIG. 8(c) may be obtained in a similar manner.

As can be understood from the foregoing descriptions, when this imaging element is set at the position of the focal length "dR" of the red light "LR" of the lens unit 100, a signal having a red color component (will be referred to as "R signal" hereinafter) acquired from the imaging element becomes such a signal which contains a steep and high gain (level) of a high frequency component. However, such a high frequency component contained in a signal having a green color component (will be referred to as "G signal" hereinafter) has been attenuated and a waveform of this G signal has been made flat, while the G signal has been acquired by imaging a green color component of the photographing object image under such a condition that the imaging element is defocused. Also, such a high frequency component contained in a signal having a blue color component (will be referred to as "B signal" hereinafter) has been furthermore attenuated and a waveform of this B signal has been made further flat, while the B signal has been acquired by imaging a blue color component of the photographing object image under such a condition that the imaging element is furthermore defocused.

The R signal, the G signal, and the B signal, which are outputted from the imaging element, are processed based upon a predetermined signal processing operation, and thereafter, a color image is displayed by employing these processed R, G, B signals. When this color image is displayed, color light corresponding to the R signal, color light corresponding to the G signal, and color light corresponding to the B signal are added to each other, so that a color of a display image is represented with respect to each of pixels. However, if a plurality of color light are added to each other which are produced based upon high frequency components of the R signal, the G signal, and the B signal, which have been adversely influenced by the axial chromatic aberration by the lens unit 100 in the above-explained manner, then an edge portion of the display image is colored based upon such a color produced by adding the color light made of these high frequency components. In this case, the green light produced by the high frequency component of the G signal and also the blue light produced by the high frequency component of the B signal have been attenuated with respect to the red light produced by the high frequency component of the R signal, so that this edge portion is displayed by using such a color (namely, false color) which is different from the edge portion in the photographing object image. Also, as represented in FIG. 8(*b*) and (*c*), the high frequency component of the G signal and the high frequency component of the B signal have been made flat with respect to the high frequency component of the R signal. As a result, chromatic blur may occur in such a manner that colors are blurred from the edge portion.

The above-explained occurrence of the false color is related to such an imaging element that the three primary colors made of red, green, blue light are separated in the spectral manner, and then, the separated color light is photoelectrically converted so as to output the color signals. This technical idea may be similarly applied even in such an imaging element that incident light is separated into four complementary colors of magenta, cyan, yellow, and green light in the spectral manner, and then, the separated color light is photoelectrically converted so as to output color signals.

As previously described, since the axial chromatic aberration shown in FIG. 7 occurs in the lens unit 100, it is no possible that as to all of the red color light "LR", the green color light "$L_G$" (not shown in FIG. 7), and the blue color light "LB", the lens unit 100 is just focused at the same time. As a result, as previously explained, in particular, the false colors and the chromatic blur occur at the edge portion containing the high frequency components, which may cause an image quality of a photographed image to be deteriorated.

Conventionally, various sorts of technical ideas have been proposed by which the chromatic blur at the edge portion caused by the axial chromatic aberration of such an imaging lens system may be corrected.

As one example of the conventional technical ideas, when color difference signals are produced from primary color signals, a difference in MTF (Modulation Transfer Function) characteristics between color components, which is caused by axial chromatic aberration, is converted in such a manner that the MTF characteristics are made coincident with such a color side that an image has been defocused. This conversion is carried out as follows: That is, for instance, a color difference signal "$C_r$" is produced by an R signal and a smoothing-processed G signal, namely, "<G> emphasized signal" by smoothing the G signal having the sharp (focused) green color component in order that the MTF characteristic of the green color component is approximated to the MTF characteristic of the red color component. Also, in a similar manner, another color difference signal "$C_b$" is produced by the B signal and this "<G> emphasized signal" by smoothing the G signal in order that the MTF characteristic of the green color component is approximated to the MTF characteristic of the blue color component. Thereafter, the G signal having the original MTF characteristic (which has not been smoothed) is added to the respective color difference signals "$C_r$" and "$C_b$" (refer to, for instance, JP-A-2007-28042).

This conventional technical idea is designed so as to avoid that the chromatic blur occurs which is caused by the axial chromatic aberration of the imaging lens system by performing the below-mentioned method: That is, the MTF characteristic of the R signal whose image has been defocused is matched with the MTF characteristic of the G signal, since the difference between the G signal having the original MTF characteristic and the G signal whose MTF characteristic is made equal to the MTF characteristic of the R signal is added to this R signal, and similarly, the MTF characteristic of the B signal is matched with the MTF characteristic of the G signal.

SUMMARY OF THE INVENTION

On the other hand, in the conventional technical idea disclosed in JP-A-2007-28042, although the chromatic blur occurred at the edge portion can be suppressed, which is caused by the axial chromatic aberration of the imaging lens system, by executing the above-described correcting process operation for the color difference signals, the respective color difference signals are merely produced by adding the G signal to such a color difference signal whose MTF characteristic has not been corrected, which has been produced from the R signal and the B signal, the MTF characteristics of which have not been corrected. Therefore, the frequency characteristics of the R signal and the B signal have not yet been improved. Moreover, since the above-descried process operation is carried out over the entire portions of the color difference signals, the resolution as to both the red color component and the blue color component of the color image to be displayed in deteriorated, so that such a color image having high precision cannot be produced.

Also, as previously explained, since the G signal is added to the red and blue color difference signals whose MTF characteristics have been deteriorated, in such a case that a R signal, a G signal, and a B signal are reproduced from these color difference signals and a luminance signal when a color image is displayed, the resulting R and G signals correspond to such color signals with which the above-described G signal has been mixed. As a result, color reproducibility with fidelity cannot be achieved.

The present invention has been made to solve the above-described problems of the conventional technical ideas, and therefore, has an object to provide an imaging apparatus capable of suppressing an occurrence of false color and chromatic blur at an edge portion of an image, which are caused by axial chromatic aberration of a lens unit, and also, capable of preventing a deterioration of color reproducibility.

To achieve the above-described object, an imaging apparatus, according to an aspect of the present invention, is featured by such an imaging apparatus comprising: a lens unit; color imaging means for separating incident light entered from the lens unit every wavelength of the incident light in a spectral manner and for photoelectrically converting the separated incident light into signals; and color signal producing means for producing a plurality of color signals based upon the signals derived from the color imaging means; and further comprising: color-depending high frequency component changing means for individually changing signal amounts with respect to the signals derived from the color imaging means, or the color signals produced from the color signal producing means in such a manner that high frequency components thereof become predetermined correction amounts.

Also, an imaging apparatus, according to another aspect of the present invention, is featured by an imaging apparatus comprising: a lens unit; color imaging means for separating incident light entered from the lens unit every wavelength of the incident light in a spectral manner and for photoelectrically converting the separated incident light into signals; and color signal producing means for producing a plurality of color signals based upon the signals derived from the color imaging means; and further comprising: signal level detecting means for detecting a difference in signal levels with respect to the signals derived from the color imaging means, or the color signals produced from the color signal producing means; and color-depending high frequency component changing means for individually changing signal amounts of high frequency components with respect to the signals derived from the color imaging means, or the color signals produced from the color signal producing means based upon a level detection result of the signal level detecting means.

Also, the imaging apparatus of the present invention is featured by further comprising: information holding means for holding information about the predetermined information amounts.

Also, the imaging apparatus of the present invention is featured by that the lens unit has a focus lens; the imaging apparatus is further comprised of: a focus lens driving unit for driving the focus lens; and a focal length control unit for adjusting a position of the focus lens so as to perform a focusing control thereof with respect to a photographing object, and for outputting focal length information, or positional information of the focus lens as optical condition information related to the focus lens; in which the color-depending high frequency component changing means changes the correction amounts based upon the optical condition information related to the focus lens.

Also, the imaging apparatus of the present invention is featured by that the lens unit has a zoom lens; the imaging apparatus is further comprised of: a zoom lens driving unit for driving the zoom lens; and an optical zooming control unit for adjusting a position of the zoom lens so as to perform an optical zooming control for changing optical magnification; in which the color-depending high frequency component changing means changes the correction amounts based upon the optical condition information related to the zoom lens.

Also, the imaging apparatus of the present invention is featured by that the lens unit has an iris; the imaging apparatus is further comprised of: an iris driving unit for driving the iris; and an iris control unit for controlling the iris driving unit and for outputting light attenuation amount information, or open/close information about the iris as optical condition information related to the iris; in which the color-depending high frequency component changing means changes the correction amounts based upon the optical condition information related to the iris.

Also, the imaging apparatus of present invention is featured by that the signal level detecting means extracts high frequency components by operating a high-pass filter with respect to the signals derived from the color imaging means, or the color signals produced from the color signal producing means, and compares the extracted high frequency components with each other.

Also, the imaging apparatus of the present invention is featured by that the signal level detecting means extracts a plurality of frequency components by employing a frequency analyzing filter with respect to the signals derived from the color imaging means, or the color signals produced from the color signal producing means, and compares the extracted frequency components with each other.

Also, the imaging apparatus of the present invention is featured by that the signal level detecting means calculates a difference value of signal levels with respect to the signals derived from the color imaging means, or the color signals produced from the color signal producing means so as to compare the difference values with each other.

Also, the imaging apparatus of present invention is featured by that individually changing of signal amounts by the color-depending high frequency component changing means implies individually changing of the signal amounts in such a manner that the high frequency components are increased.

Also, the imaging apparatus of the present invention is featured by that when the color-depending high frequency component changing means individually changes the signal amounts in such a manner that the high frequency components are increased, the color-depending high frequency component changing means increases the high frequency components in such a manner that a gain difference of the high frequency components every signal derived from the color imaging means, or every color signal produced from the color signal producing means becomes small.

Also, the imaging apparatus of the present invention is featured by that when the color-depending high frequency component changing means individually changes the signal amounts in such a manner that the high frequency components are increased, the color-depending high frequency component changing means increases the high frequency components in such a manner that a gain difference of the high frequency components every signal derived from the color imaging means, or every color signal produced from the color signal producing means becomes large.

Also, the imaging apparatus of present invention is featured by that individually changing of signal amounts by the color-depending high frequency component changing means implies individually decreasing of the high frequency components in such a manner that a gain difference of the high frequency components every signal derived from the color imaging means, or every color signal produced from the color signal producing means becomes large.

Also, the imaging apparatus of present invention is featured by that individually changing of signal amounts by the color-depending high frequency component changing means implies changing of signal amounts in such a manner that an edge portion of a signal waveform becomes steep, or changing of signal amounts in such a manner that a stepped portion of the edge portion of the signal waveform becomes large.

Also, the imaging apparatus of the present invention is featured by that the color imaging means is constructed of a single plate color imaging element in which pixels having at lest two sorts of color filters have been arranged; in which the color signal producing means produces the color signals by performing an interpolating process with respect to the signals derived from the single plate color imaging element.

Also, the imaging apparatus of the present invention is featured by that the color imaging means is constructed of a single plate color imaging element in which pixels having at lest two sorts of color filters have been arranged; in which the color signal producing means produces the color signals by performing a matrix calculating process with respect to the signals derived from the single plate color imaging element.

Also, the imaging apparatus of the present invention is featured by that the color imaging means is arranged by a prism for separating the incident light entered from the lens unit every wavelength of the incident light, and at least two groups of imaging elements for photoelectrically converting the separated incident light, respectively; in which the color signal producing means produces the color signals by performing a matrix calculating process with respect to the signals derived from the groups of color imaging elements.

Also, the imaging apparatus of the present invention is featured by that the respective color signals whose signal levels are corrected by the color-depending high frequency component changing means are an R(red) signal, a G(green) signal, and a B(blue) signal of three primary colors.

Also, the imaging apparatus of the present invention is featured by that the respective color signals whose signal levels are corrected by the color-depending high frequency component changing means are an R(red) signal, a G(green) signal, and a B(blue) signal of three primary colors, and also, a yellow signal having a wavelength between the R signal and the G signal, and further, a cyan signal having a wavelength between the G signal and the B signal.

Moreover, the imaging apparatus of the present invention is featured by further comprising luminance signal producing means for producing a luminance signal by employing the signals derived from the color-depending high frequency component changing means.

In accordance with the imaging apparatus of the present invention, the high frequency component for each of the color signals can be corrected. Even when the frequency characteristics for the respective color signals are different from each other, these frequency characteristics can be made uniform. As a result, the false color and the chromatic blur at the edge portion of the image, which are caused by the axial chromatic aberration of the lens unit, can be suppressed, while the resolution and the color reproducibility are not deteriorated. Also, the luminance signal is produced based upon the color signals obtained after the high frequency components have been corrected, so that the luminance signal having the high resolution can be produced.

Also, since the waveform response at the edge portion, which has been influenced by the axial chromatic aberration of the lens unit, is corrected in the reverse sense, the false color and the chromatic blur, which are caused by the axial chromatic aberration of the lens unit, can be emphasized. As a result, these emphasized false color and chromatic blur can represent the specific effect.

It should be understood that purposes/means/effects other than the above-described items may become apparent with reference to the below-mentioned embodiments.

DETAILED DESCRIPTION OF THE INVENTION

Referring now to drawings, a description is made of various sorts of embodiments according to the present invention.

Figure 1:
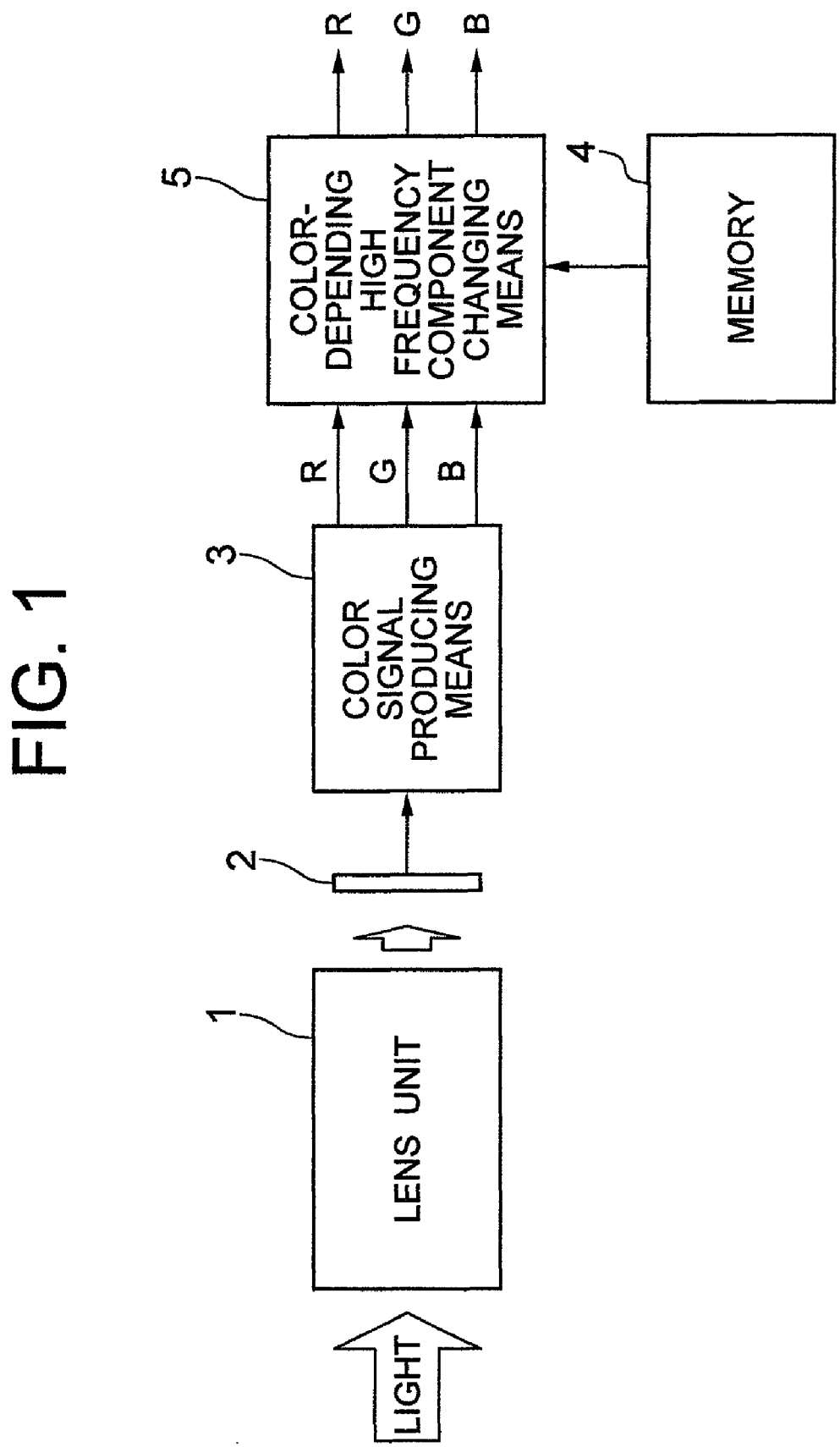
FIG. 1 is a block diagram for schematically showing a structure of an imaging apparatus according to a first embodiment of the present invention.

FIG. 1 is a structural diagram of an imaging apparatus according to a first embodiment of the present invention. In the imaging apparatus of FIG. 1, reference numeral 1 shows a lens group (lens unit); reference numeral 2 indicates color imaging means; reference numeral 3 represents color signal producing means; reference numeral 4 shows a memory, and reference numeral 5 indicates color-depending high frequency component changing means.

In FIG. 1, while light is irradiated via the lens unit 1 onto the color imaging means 2, an image of a photographing object (not shown) is focused on an imaging plane (not shown) of the color imaging means (color imaging element) 2. The color imaging element 2 separates the above-described image of the photographing object every wavelength of the light in a spectral manner, and thereafter, photoelectrically converts the separated image light so as to output signals in response to the photographing object image. The color signal producing means 3 produces at least two sorts of color signals based upon the signals outputted from the color imaging element 2. In this imaging apparatus, it is so designed that the color signal producing means 2 produces, for instance, R(red), G(green), and B(blue) color signals of three primary colors. The color signals constituted by the R signal, the G signal, and the B signal are supplied to the color-depending high frequency component changing means 5.

In such a case that the color imaging means 2 corresponds to a single plate imaging element in which at least filters of the 3 primary colors (namely, R color, G color, and B color) arranged every pixel are arranged in Bayer array, the color signal producing means 3 extracts pixel signals of the same color filters with respect to each of the R color, the G color, and the B color, and then, performs an interpolating process, so that R, G, B color signals are obtained.

Also, in such a case that the color imaging means 2 employs complementary color filters with respect to cyan, yellow, and magenta colors as the color filters which are used in the respective pixels, the color imaging means 2 may separate the input image signal into the respective complementary color signals, and then, may perform a matrix calculating process with respect to these complementary color signals, so that the R, G, B signals of the three primary colors may be obtained in a similar manner. Moreover, in the case that color filters other than the above-described complementary color filters are employed with respect to the respective pixels, since both the matrix calculating process and the interpolating process are employed, the R, G, B signals of the 3 primary colors may be obtained in a similar manner.

Figure 2:
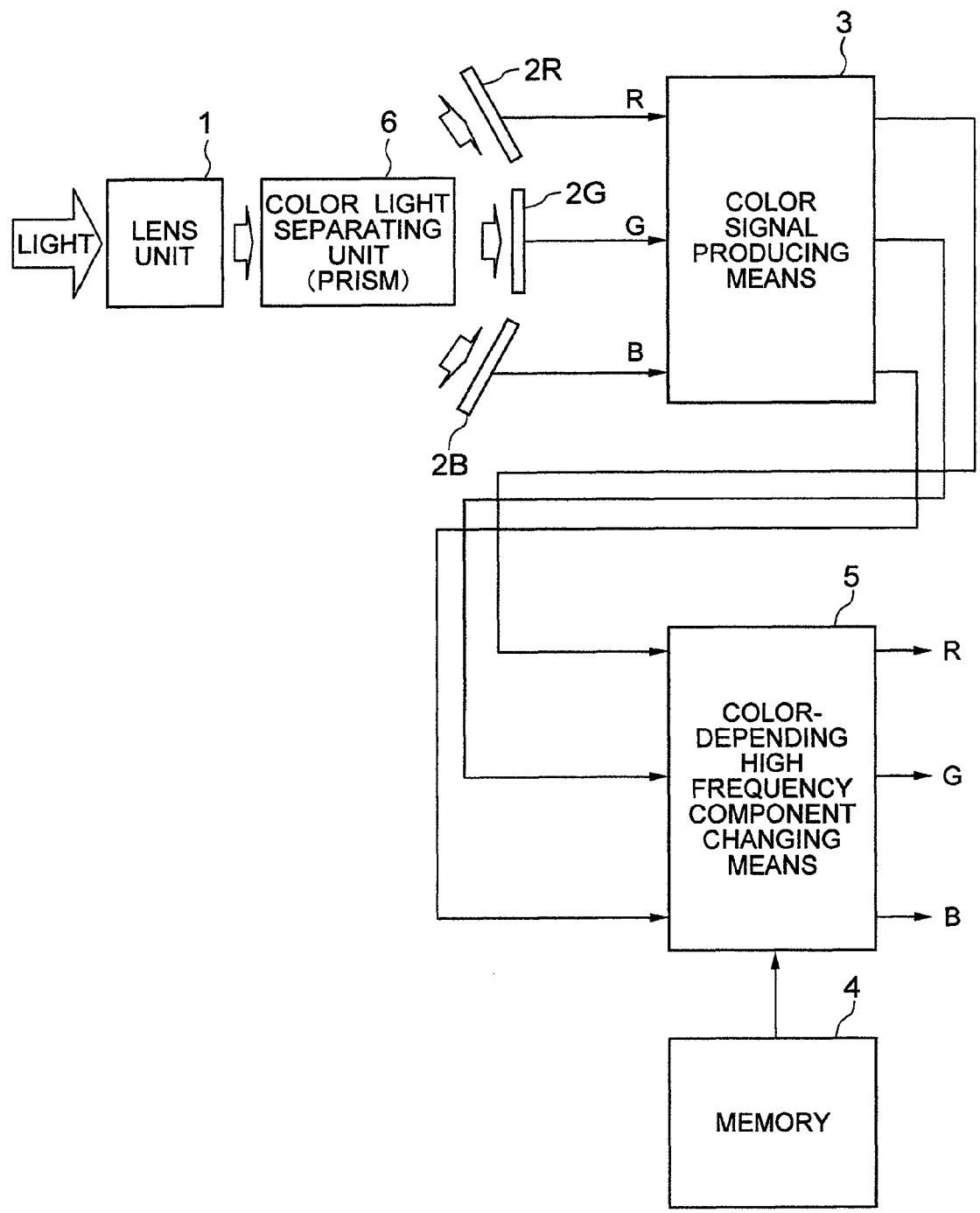
FIG. 2 is a block diagram for schematically indicating another structure of the imaging apparatus according to the first embodiment of the present invention.

Alternatively, as shown in FIG. 2, the color imaging means 2 may be arranged by employing a color light separating unit 6 constructed of a prism, and by employing a plurality of imaging elements which photoelectrically convert the light after being separated in the spectral manner. This color light separating unit 6 separates the light entered from the photographing object via the lens unit 1 into a plurality of light corresponding to such light having a plurality of light wavelengths, for example, R(red) color light, G(green) color light, and B(blue) color light. Also, as the plurality of imaging elements, an R color-purpose imaging element 2R, a G color-purpose imaging element 2G, and a B color-purpose imaging element 2B have been provided, so that the R, G, B signals of the 3 primary colors can be obtained. In the R color-purpose imaging element 2R, the R-color light separated from the color light separating unit 6 is entered; an optical image of an R-color component of the photographing object image is focused; and then, this focused optical image is imaged so as to output an R color signal. In the G color-purpose imaging element 2G, the G-color light separated from the color light separating unit 6 is entered; an optical image of a G-color component of the photographing object image is focused; and then, this focused optical image is imaged so as to output a G color signal. In the B color-purpose imaging element 2B, the B-color light separated from the color light separating unit 6 is entered; an optical image of a B-color component of the photographing object image is focused; and then, this focused optical image is imaged so as to output a B color signal. Moreover, in such a case that colors other than these R, G, B colors of the three primary colors are separated by a prism in a spectral manner, R, G, B color signals of the three primary colors may be produced in a similar manner by employing the matrix calculating process and the interpolating process.

On the other hand, in the memory 4, information of correction amounts with respect to a high frequency component as to each of the R signal, the G signal, and the B signal has been stored in a table (not shown) in relation to wavelength information of the light. This wavelength information of the light is employed in order to discriminate the information of these correction amounts from each other with respect to each of the R signal, the G signal, and the B signal. Based upon the wavelength information of the light, information about the correction amounts of the R signal, the G signal, and the B signal can be discriminated from each other.

Also, the information about correction amounts with respect to the high frequency components of the R signal, the G signal, and the B signal corresponds to information which is used in order to correct attenuations of high frequency components, which are caused by the axial chromatic aberration of the lens unit 1. These correction amounts have been previously measured, and then, the measured correction amount information has been stored in the memory 4.

It should be noted that although the above-described information about the correction amounts has been stored in the memory 4, other means may be alternatively employed instead of the memory 4. For instance, such a recording/holding means for holding thereon the correction amounts may be alternatively employed. For instance, it may be alternatively realized by that the information about the correction amounts has been given as an initial value on a signal processing circuit.

When a power supply (not shown) of the imaging apparatus is turned ON, the color-depending high frequency component changing means 5 acquires the information about the correction amount every R signal, G signal, and B signal from the table of the memory 4, and changes the signal level of the high frequency component every R signal, G signal, and B signal.

As previously described, the high frequency characteristics of the R signal, the G signal, and the B signal can be corrected, which have been adversely influenced by the axial chromatic aberration of the lens unit 1. As a result, while resolution and color reproducibility are not deteriorated, the false color and the chromatic blur can be suppressed which are caused by the axial chromatic aberration of the lens unit 1. Furthermore, since the high frequency characteristics of the R signal, the G signal and the B signal, which have been adversely influenced by the axial chromatic aberration, are corrected in a reverse sense, the reverse-biased false color and the reverse-biased chromatic blur can be emphasized so as to be added as a specific effect.

It should also be noted that in the above-described example, the color-depending high frequency component changing means 5 has changed the signal levels of the high frequency components with respect to the R, G, B signals of the three primary colors. However, the signal level changes by the color-depending high frequency component changing means 5 are not limited only to the R, G, B signals.

Figure 3A:
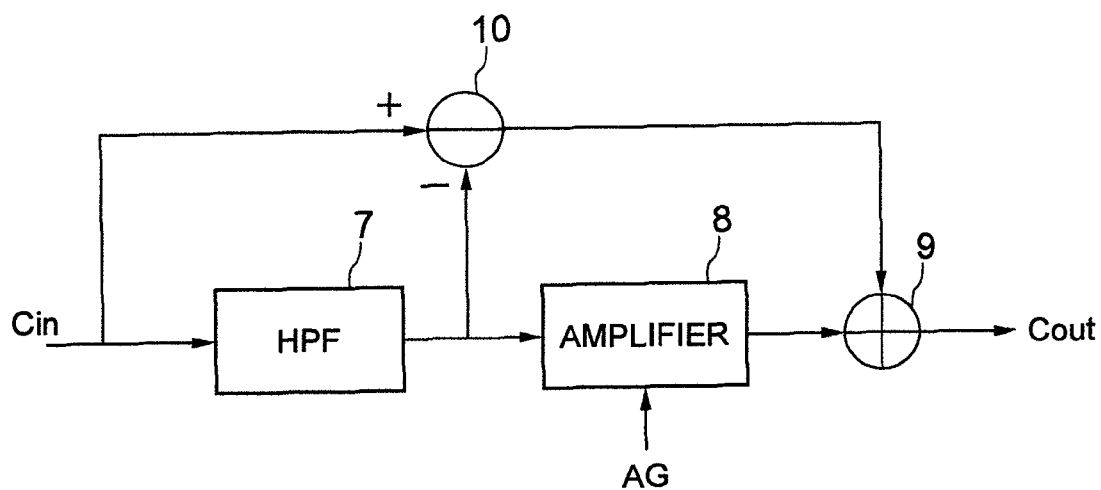
FIG. 3A and FIG. 3B are circuit diagrams for representing a concrete example as to color-depending high frequency component changing means employed in the imaging apparatus of the first embodiment.
Figure 3B:
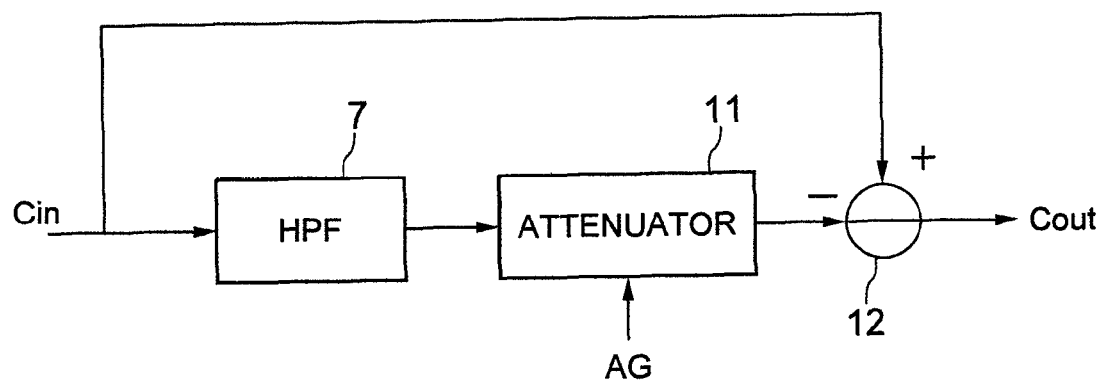

FIG. 3A and FIG. 3B are circuit diagrams for showing a concrete example as to the above-described color-depending high frequency component changing means 5 provided in FIGS. 1 and 2. In this concrete example, reference numeral 7 indicates an HPF (high-pass filter); reference numeral 8 shows an amplifier; reference numeral 9 represents an adder; reference numeral 12 shows an attenuator; and reference numeral 10 indicates a subtracter.

In FIG. 3A, one of color signals supplied from the color signal producing means 3 (shown in FIG. 1) is inputted to the color-depending high frequency component changing means 5 as an input color signal "$C_{in}$", and then, the input color signal "$C_{in}$" is entered to the HPF 7 and the subtracter 10. The HPF 7 extracts a high frequency component of the input color signal "$C_{in}$", and supplies the high frequency component extracted from the input color signal "$C_{in}$" to the amplifier 8. In this amplifier 8, gain information "AG" for correction information as to a high frequency component corresponding to the above-explained input color signal "$C_{in}$" is acquired from the memory 4 (shown in FIG. 1 and FIG. 2), and then, the high frequency component of the input color signal "$C_{in}$" supplied from the HPF 7 is amplified based upon the acquired gain information "AG." The high frequency component outputted from the amplifier 8 is supplied to the adder 9. Also, in the subtracter 10, the high frequency component of the input color signal "$C_{in}$" extracted by the HPF 7 is subtracted from the input color signal "$C_{in}$", and then, the subtracted signal is supplied to the adder 9. In this adder 9, the high frequency component of the input color signal "$C_{in}$" extracted from the HPF 7 is added to the subtraction signal produced by subtracting the high frequency component from the input color signal "$C_{in}$" in the subtracter 10, and then, the added signal is outputted from the color-depending high frequency component changing means 5 (indicated in FIG. 1 and FIG. 2) as a color signal "$C_{out}$" whose high frequency component has been corrected. In this concrete example, assuming now that the gain information AG=1 time, the color signal "$C_{out}$" becomes equal to the input color signal "$C_{in}$." If the gain information is selected as AG>1 time, then the color signal "$C_{out}$" whose high frequency component has been amplified is obtained. If the gain information is selected as AG<1 time, then the color signal "$C_{out}$" whose high frequency component has been attenuated is obtained.

As apparent from the foregoing description, when the signal whose high frequency component has been subtracted from the input color signal "$C_{in}$" by the subtracter 10 is added to the high frequency component outputted from the amplifier 8, the input color signal "$C_{in}$" must be processed in such a delaying manner that the timing of the high frequency component of this input color signal "$C_{in}$" is made coincident with such a timing that the above-described high frequency component is extracted by the HPF 7, and then, the extracted high frequency component is outputted from the amplifier 8 so as to be supplied to the adder 9.

It is so designed that the correcting circuit having the above-described circuit arrangement has been provided with respect to at least one color signal whose high frequency component is corrected. Also, it is assumed that the gain information "AG" acquired from the memory 4 is defined as such a gain information used to amplify a high frequency component every color in order to reduce an attenuation of the high frequency component every color, which has been produced by the axial chromatic aberration of the lens unit 1. As a consequence, a false color and a chromatic blur at an edge portion of an image can be suppressed which are caused by the axial chromatic aberration of the lens unit 1. Also, while the color reproducibility is not deteriorated, the deterioration in the resolution can be improved.

Alternatively, the gain information "AG" acquired from the memory 4 may be utilized as such a gain information by which the attenuation of the high frequency component every color caused by the axial chromatic aberration of the lens unit 1 may be furthermore advanced so as to attenuate the high frequency component every color. As a result, the false color and the chromatic blur at the edge portion of the image may be further emphasized which are caused by the axial chromatic aberration of the lens unit 1, so that these emphasized false color and emphasized chromatic blur may be added as a specific effect.

Moreover, in this first embodiment, if such an imaging apparatus may be arranged in that gain information "AG1" and gain information "AG2" may be stored in the memory 4, and the amplifier 8 may selectively switch the gain information "AG1" and the gain information "AG2", then an image quality correcting function and a specific effect function may be alternatively selected so as to be executed. That is, the above-described gain information "AG1" may reduce an attenuation of a high frequency component every color, which has been caused by the axial chromatic aberration of the lens unit 1, whereas the above-explained gain information "AG2" may further advance the attenuation of the high frequency component every color, which has been caused by the axial chromatic aberration of the lens unit 1. The above-explained correction function may correct such image quality results that the false color and the chromatic blur at the edge portion occur, and the resolution is deteriorated, due to the axial chromatic aberration of the lens unit 1. Conversely, the above-explained specific effect function may emphasize the false color and the chromatic blur at the edge portion.

Another concrete example of the color-depending high frequency component changing means 5 represented in FIG. 3B is designed as follows: That is, a false color and a chromatic blur at an edge portion of an image are emphasized so as to achieve a specific effect. Conversely, in the first-mentioned concrete example shown in FIG. 3A which corrects the high frequency component in order that the false color and the chromatic blur at the edge portion of the image, which are caused by the axial chromatic aberration of the lens unit 1, are suppressed.

In FIG. 3B, an input color signal "$C_{in}$" is supplied to the HPF 7 so as to extract a high frequency component of this color signal "$C_{in}$", and then, the extracted high frequency component is attenuated by an attenuator 11 in response to the gain information "AG" of the high frequency component correction information corresponding to this input color signal "$C_{in}$", which has been set from the memory 4 (shown in FIGS. 1 and 2). The attenuated high frequency component outputted from the attenuator 11 is supplied to a subtracter 12 in order that the attenuated high frequency component is subtracted from the input color signal "$C_{in}$."

In this concrete example, as to such a color signal whose high frequency component is processed, either one or two sorts of the R, G, B signals of the three primary colors are selected as the color signals which are largely influenced by the axial chromatic aberration of the lens unit 1. As a result, the adverse influence caused by the axial chromatic aberration of the lens unit 1 is furthermore enlarged, so that the false color and the chromatic blur at the edge portion are furthermore emphasized.

Alternatively, in the first embodiment, while the correcting circuit shown in FIG. 3A and the correcting circuit indicated in FIG. 3B may be selected, the image quality result correcting function and the specific effect function may be selectively performed. In the image quality result correcting function, such an image quality result as to the false color and the chromatic blur at the edge portion and the deterioration of the resolution due to the axial chromatic aberration of the lens unit 1 may be corrected. Conversely, in the specific effect function, the false color and the chromatic blur at the edge portion may be emphasized.

Also, the color-depending high frequency component changing means 5 may be alternatively arranged by a color-depending edge judging unit and an edge correcting unit. The color-depending edge judging unit judges/detects an edge portion with respect to each of the R signal, the G signal and the B signal. The edge correcting unit performs an edge correction based upon a judgement result obtained from the color-depending edge judging unit. When the edge judging unit judges/detects an edge portion as to each of the R signal, the G signal, and the B signal, the edge judging unit supplies a result of this judgement (namely, both information indicative of color signal whose edge portion has been detected, and information for indicating that edge portion has been detected) to the color-depending edge correcting unit at timing of the judging/detecting operation. While information about a method for correcting the edge portion has been previously stored in the memory 4, the color-depending edge correcting unit refers to the information about the correcting method stored in the memory 4, and performs a correcting process operation with the edge portion of the color signal whose edge portion has been detected. As the method for detecting/judging the edge portion, the below-mentioned method is employed. That is, for instance, a difference of signal values between pixels (namely, pixel signal values) is calculated, and when this calculated difference value exceeds a preset threshold, this pixel is judged as a pixel at the edge portion.

Figure 4A:
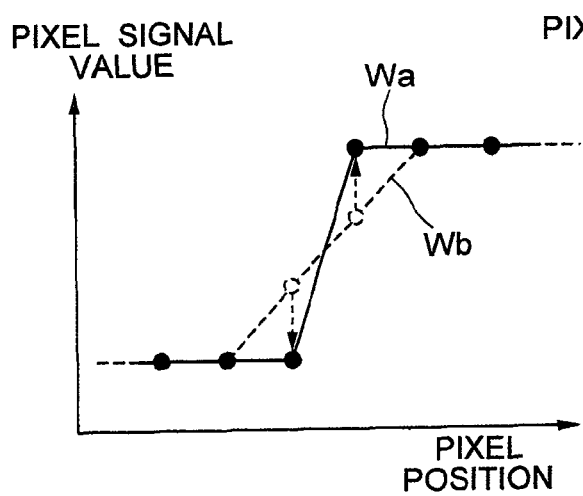
FIG. 4A and FIG. 4B are waveform diagrams for indicating a concrete example as to a color-depending edge correcting method executed by the imaging apparatus of the first embodiment.
Figure 4B:
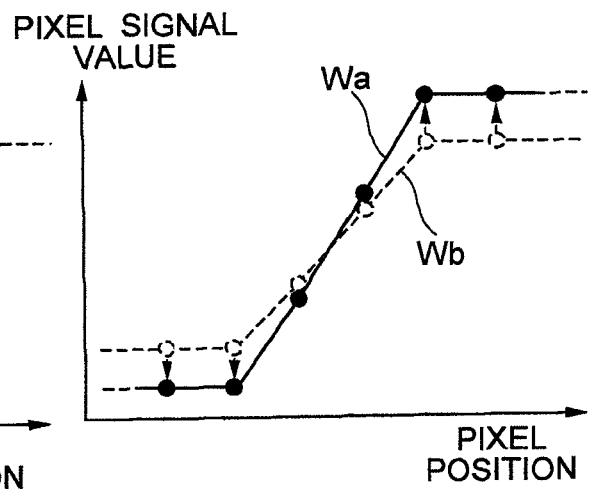

As the edge portion correcting method executed in the color-depending edge correcting unit, there are the below-mentioned edge portion correcting methods: That is, for example, in the case that a rising edge is corrected, as shown in FIG. 4A, with respect to a waveform "Wb", a pixel signal value of a pixel on the tip side of an edge portion thereof is decreased, and also, a pixel signal value of a pixel on the terminal side of the edge portion is increased so as to make a waveform of the edge portion steep, so that the above-described waveform "Wb" is corrected as such a waveform "Wa" whose edge becomes sharp. Further, as represented in FIG. 4B, with respect to the waveform "Wb", pixel signal values of pixels defined from the forward side of the edge portion thereof up to the tip side of the edge portion are decreased, and also, pixel signal values of pixels defined from the terminal side of the edge portion up to the backward portion of this edge portion are increased, so that the above-described waveform "Wb" is corrected as such a waveform "Wa" whose edge portion is made large.

In the case that the waveforms at the edge portions are corrected in the above-described manner, as previously explained in the respective embodiments, since degrees of corrections for the above-described edge portions with respect to the R signal, the G signal, and the B signal are set in response to degrees as to false colors and chromatic blur, which are caused by chromatic aberration of lens units, it is possible to avoid that the above-described false colors and chromatic blur occur, while color reproducibility and resolution are not deteriorated. Also, only such a portion is detected by the color-depending edge judging unit, in which a false color and a chromatic blur, and also, a deterioration of resolution at an edge portion caused by the axial chromatic aberration of the lens unit 1 may conspicuously appear, and thus, only such a place can be corrected that a deterioration of an image quality may conspicuously appear. This image quality deterioration is caused by the false color and the chromatic blur at the edge portion, and the deterioration in the resolution, which are caused by the axial chromatic aberration of the lens unit 1. As a result, power consumption may also be lowered than power consumption when the corrections are continuously made.

It should also be noted that in this first embodiment, with respect to the R signal, the G signal, and the B signal of the 3 primary colors, the signal levels of the high frequency components thereof have been changed. Alternatively, the signal level changing operation by the present invention need not be applied only to the R signal, the G signal, and the B signal of the three primary colors. For instance, the color signal producing means 3 (indicated in FIGS. 1 and 2) is designed so as to produce the yellow color signal corresponding to the wavelength between the R signal and the G signal, and the cyan color signal corresponding to the wavelength between the B signal and the G signal in addition to the R signal, the G signal, and the B signal. Accordingly, if signal levels of high frequency components with respect to 5 sorts of color signals are changed, then it is possible to correct deteriorations in image qualities caused by false colors, chromatic blur, and deteriorations of resolution at edge portions due to the on-axis chromatic aberration of the lens unit 1. Moreover, the R signal, the G signal, the B signal, the yellow color signal, and the cyan color signal may be precisely corrected every narrower wavelength of light, as compared with that of such a case that the signal levels of the high frequency components with respect to the R signal, the G signal, and the B signal.

Alternatively, if the imaging apparatus may be arranged by additionally employing a luminance signal producing means (not shown) for producing a luminance signal based upon the signal derived from the color-depending high frequency component changing means 5, then a resolution deterioration of luminance at the edge portion due to the axial chromatic aberration of the lens unit 1 may be alternatively suppressed.

Figure 5:
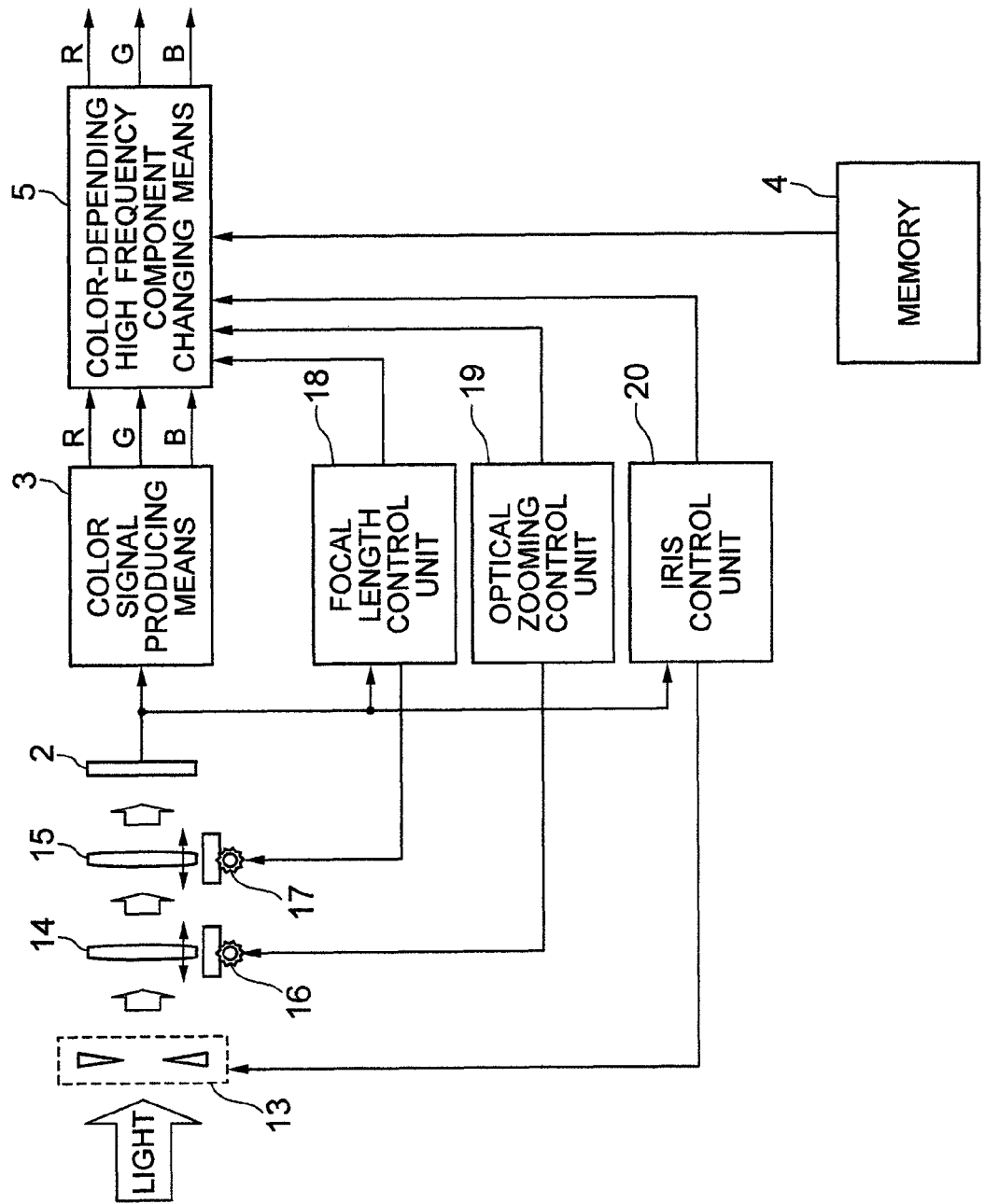
FIG. 5 is a block diagram for schematically showing a structure of an imaging apparatus according to a second embodiment of the present invention.

FIG. 5 is a block diagram for schematically showing a structure of an imaging apparatus according to a second embodiment of the present invention. In FIG. 5, reference numeral 13 shows an iris; reference numeral 14 indicates a zoom lens; reference numeral 15 represents a focus lens; reference numeral 16 shows a zoom lens driving unit; reference numeral 17 indicates a focus lens driving unit; reference numeral 18 represents a focal length control unit; reference numeral 19 shows an optical zooming control unit; and reference numeral 20 indicates an iris control unit. It should be noted that the same reference numerals shown in FIG. 1 to FIG. 4 will be employed for denoting the same structural elements shown in FIG. 5, and therefore, the same descriptions thereof will be omitted.

In FIG. 5, light from a photographing object (not shown) is entered to a color imaging means 2 through the iris 13, the zoom lens 14, and the focus lens 15, which constitute a lens unit (lens group), and then, an image of the photographing object is focused onto an imaging plane of a color imaging means 2. The color imaging element 2 separates this photographing object image every wavelength of the light in a spectral manner, and thereafter, images the separated photographing object images so as to output signals in response to the photographing object image. The color signal producing means 3 produces at least 2 sorts of color signals based upon the signals outputted from the color imaging element 2. For example, it is so assumed that the color signal producing means 3 produces an R signal, a G signal, and a B signal of three primary colors. The color signals made of these R, G, B color signals are supplied to the color-depending high frequency component changing means 5, and further, supplied to the focal length control unit 18, the optical zooming control unit 19, and the iris control unit 20.

It is also designed that the focal length control unit 18 has an auto-focus function. That is, for example, the auto-focus function of this focal length control unit 18 differentiates an image signal derived from the imaging element 2, and furthermore, integrates the differentiated image signals to obtain an integrated value; while this integrated value is employed as an index, the focal length control unit 18 detects a focusing degree with respect to the photographing object based upon this index; and the focal length control unit 18 controls the focus lens driving unit 17 based upon the detected focusing degree so as to adjust a position of the focus lens 15 in such a manner that a focal point thereof can be focused on the photographing object. Also, it may be so designed that the focal distance control unit 18 has a manual focus function. That is, for instance, when a predetermined focal length is instructed by a manual operation by a user, the focal length control unit 18 controls the focus lens driving unit 17 so as to adjust a position of the focus lens 15 in such a manner that a focal point thereof becomes equal to the instructed focal length.

It is also designed that, for instance, when predetermined zooming magnification is instructed by a manual operation by the user, the optical zooming control unit 19 controls the zoom lens driving unit 16 so as to adjust a position of the zoom lens 14 in such a manner that this instructed zooming magnification can be achieved.

Also, it is so designed that the iris control unit 20 has an auto-iris function. That is, for example, while the auto-iris function of the iris control unit 20 calculates an averaged level of the image signals derived from the color imaging element 2 and then employs this averaged level as an index, the iris control unit 20 judges an exposure status with respect to the photographing object based upon this index; the iris control unit 20 controls to open/close the iris 13 so as to adjust an exposure amount with respect to the photographing object in such a manner that an optimum exposure condition can be established. Moreover, it is designed that the iris control unit 20 has a manual iris function. That is, for example, when a predetermined exposure status is instructed by a manual operation by the user, the iris control unit 20 controls the iris driving unit 22 so as to control opening/closing operations for the iris 13 in such a manner that this instructed exposure status can be achieved.

As previously explained, if the focusing control is performed by the focal length control unit 18, the zooming magnification control is performed by the optical zooming control unit 19, and the light amount control is performed by the iris control unit 20, then an optical condition is changed. As a consequence, axial chromatic aberration of the lens group (lens unit) is changed which is constituted by such optical lenses as the zoom lens 14 and the focus lens 16, so that a fluctuation of a frequency characteristic every wavelength of the light is changed, namely, is changed with respect to each of the wavelengths of the light of the photographing object. As a result, when the above-described control operations are carried out, in particular, false colors and chromatic blur occurred at an edge portion of an image are conspicuously changed.

The imaging apparatus of the second embodiment has such a feature that even when the false colors and the chromatic blur are changed due to the change in the optical conditions, these false colors and chromatic blur can be corrected.

To this end, in the imaging apparatus of the second embodiment, the focal length control unit 18 outputs as optical condition information either focal length information or positional information (will be referred to as "focus information" hereinafter) of the focus lens 15; the optical zooming control unit 19 outputs as the optical condition information either magnification information or positional information (will be referred to as "zoom information" hereinafter) of the zoom lens 14; the iris control unit 20 outputs as the optical condition information either optical attenuation amount information or such an information (will be referred to as "iris information" hereinafter) which indicates open/close situations of the iris 13; and also, the color-depending high frequency component changing means acquires correction amount information as to a high frequency component from the table of the memory 4 with respect to each of the R signal, the G signal, and the B signal based upon all of the above-explained optical condition information (namely, focus information, zoom information, and iris information) so as to correct signal levels of the high frequency components with respect to these R signal, G signal, and B signal, respectively.

The table (not shown) which has been stored in the memory 4 is constructed of correction amount information of high frequency components with respect to each of the R, G, B signals, depending upon respective values within changeable ranges for the focus information, the zoom information, and the iris information, while the correction amount information is provided in order to correct the false colors and the chromatic blur at the edge portions, which are caused by the chromatic aberration of the lens unit. The focus information derived from the focal length control unit 18 changes every time the focusing operation is carried out; the zoom information derived from the optical zooming control unit 19 changes every time the zooming operation is carried out; and the iris information derived from the iris control unit 20 changes every time opening/closing operations of the iris 13 are carried out. However, every time the color-depending high frequency component changing means 5 acquires the focus information derived from the focal length control unit 18, the zoom information derived from the optical zooming control unit 19, and the iris information derived from the iris control unit 20 respectively, this color-depending high frequency changing means 5 is designed to acquire correction amount information of the high frequency components from the memory 4 in response to the focus information, the zoom information, and the iris information at this time.

As a consequence, even in such a case that any one of the focusing operation by the focus lens 15, the zooming operation by the zoom lens 14, and the opening/closing operations for the iris 13 is carried out, so that the optical condition changes, the correction amount information of the high frequency component every R signal, G signal, and B signal in response to this charged optical condition may be acquired from the memory 4 so as to be set to the color-depending high frequency component changing means 5. Accordingly, even when the chromatic aberration of the lens unit changes, so that the false colors and the chromatic blur at the edge portion are brought into change situations, these false colors and chromatic blur may be corrected while the resolution and the color reproducibility are not deteriorated. Also, alternatively, even when the chromatic aberration of the lens unit changes, so that the false colors and the chromatic blur at the edge portion are brought into change situations, these false colors and chromatic blur may be conversely emphasized and may be added as a specific effect by correcting the high frequency characteristics of the R, G, B signals in the reverse sense, which are adversely influenced by the axial chromatic aberration.

It should also be understood that in this example, all of the optical conditions with respect to the focal length control unit 18, the optical zooming control unit 19, and the iris control unit 20 have been employed in order to correct the false colors and the chromatic blur at the edge portion, which are caused by the chromatic aberration of the lens unit 1. However, the present invention is not limited only to the above-described example. Alternatively, one, or more sets of these optical conditions may be employed.

Also, in this example, three sets of the below-mentioned optical elements/units have been mounted at the same time on the imaging apparatus, namely, a first set of the iris 13 and the iris control unit 20; a second set of the optical zoom lens 14, the optical zoom lens driving 16, and the optical zooming control unit 19; and further, a third set of the focus lens 15, the focus lens driving unit 17, and the focal length control unit 18 have been simultaneously mounted thereon. Alternatively, any one of these three sets, or only any two sets may be mounted.

Although the characteristics as to the high frequency components of the R, G, B color signals of the three primary colors have been corrected in the above-described example, the present invention is not limited only to this example. For instance, with respect to a high frequency component as to one, or more sorts of color signals, the characteristic thereof may be alternatively corrected. In this alternative case, while a color signal and a characteristic of this color signal among one, or more sorts of color signals may be previously measured, the high frequency component of which is changed in response to a change in optical conditions of the focal length control unit 18, the optical zooming control unit 19, and the iris control unit 20, the color-depending high frequency component changing means 5 may previously store correction amount information of the high frequency component based upon the measurement result into the memory 4. Then, the color-depending high frequency component changing means 5 may acquire the correction amount information with respect to this color signal from the memory 4 in response to the change in the optical conditions of the focal length control unit 18, the optical zooming control unit 19, and the iris control unit 20 so as to change the signal level of the high frequency component. For instance, similar to the previous first embodiment, the color signal producing means 3 is designed so as to produce the yellow color signal corresponding to the wavelength between the R signal and the G signal, and the cyan color signal corresponding to the wavelength between the B signal and the G signal in addition to the R signal, the G signal, and the B signal. Accordingly, if signal levels of high frequency components with respect to 5 sorts of color signals are changed, then it is possible to correct deteriorations in image qualities caused by false colors and chromatic blur at edge portions due to the axial chromatic aberration of the lens unit 1, and deteriorations of resolution. Moreover, the R signal, the G signal, the B signal, the yellow color signal and the cyan color signal may be precisely corrected every narrower wavelength of light, as compared with that of such a case that the signal levels of the high frequency components are changed with respect to the R signal, the G signal, and the B signal.

Similar to the previous first embodiment, the color-depending high frequency component changing means 5 may be alternatively arranged as the arrangement shown in FIG. 3A. The gain information "AG" to be acquired from the memory 4 may be alternatively utilized as such a gain information for amplifying the high frequency component every color signal in order to reduce attenuations of the high frequency components every color signal which are caused by the axial chromatic aberration of at least one optical condition for the focal length control unit 18, the optical zoom control unit 19, and the iris control unit 20. As a result, the false color and the chromatic blur at the edge portion of the image caused by the axial chromatic aberration of the lens unit 1 may be suppressed. Also, while the color reproducibility may not be deteriorated, the deterioration of the resolution may be improved.

Also, similar to the previous first embodiment, the gain information "AG" to be acquired from the memory 4 may be alternatively utilized as such a gain information for attenuating the high frequency component every color signal in order to furthermore advance attenuations of the high frequency components for these color signals, which are caused by the axial chromatic aberration of at least one optical condition with respect to the focal length control unit 18, the optical zoom control unit 19, and the iris control unit 20. As a result, the false color and the chromatic blur at the edge portion of the image, which are caused by the axial chromatic aberration of the lens unit 1 may be furthermore emphasized, and the emphasized false color and the emphasized chromatic blur may be added as a specific effect.

Alternatively, similar to the previous first embodiment, the imaging apparatus may be arranged as follows: That is, while gain information "AG1" and gain information "AG2" have been previously stored in the memory 4, the amplifier 8 may alternatively switch the gain information "AG1" and the gain information "AG2." The above-described gain information "AG1" may be employed as such a gain information for amplifying the high frequency component every color signal in order to reduce attenuations of the high frequency components every color signal, which are caused by the axial chromatic aberration of at least one optical condition with respect to the focal length control unit 18, the optical zoom control unit 19, and the iris control unit 20, whereas the above-explained gain information "AG2" may be employed as such a gain information for attenuating the high frequency component every color signal in order to furthermore advance attenuations of the high frequency components every color signal, which are caused by this axial chromatic aberration. As a result, the imaging apparatus may alternatively select an image quality correcting function and a specific effect function to execute the selected function. The above-explained image quality correcting function may correct such image quality effects that the false color and the chromatic blur at the edge portion occur, and the resolution is deteriorated, due to the axial chromatic aberration of the lens unit 1. Conversely, the above-explained specific effect function may emphasize the false color and the chromatic blur at the edge portion.

Also, similar to the previous first embodiment, in such a case that the color-depending high frequency component changing means 5 may be alternatively arranged by a color-depending edge judging unit and an edge correcting unit, while the color-depending edge judging unit judges/detects an edge portion with respect to each of the R signal, the G signal, and the B signal, and also, the edge correcting unit performs an edge correction based upon a judgement result obtained from the color-depending edge judging unit, only such a portion that resolution conspicuously appears may be alternatively detected by the color-depending edge judging unit, and also, only such a place may be alternatively corrected, in which deterioration of an image quality may conspicuously appear. This image quality deterioration is caused by the false color and the chromatic blur at the edge portion, and the deterioration in the resolution, which are caused by the axial chromatic aberration as to at least one of the optical conditions with respect to the focal length control unit 18, the optical zooming control unit 19, and the iris control unit 20. As a result, power consumption may also be lowered than power consumption when the corrections are continuously made.

Moreover, similar to the previous first embodiment mode, if the imaging apparatus may be alternatively arranged by additionally employing a luminance signal producing means (not shown) for producing a luminance signal based upon the signal derived from the color-depending high frequency component changing means 5, then a resolution deterioration of luminance at the edge portion may be alternatively suppressed which is caused by the axial chromatic aberration as to at least one of the optical conditions with respect to the focal length control unit 18, the optical zoom control unit 19, and the iris control unit 20.

Figure 6:
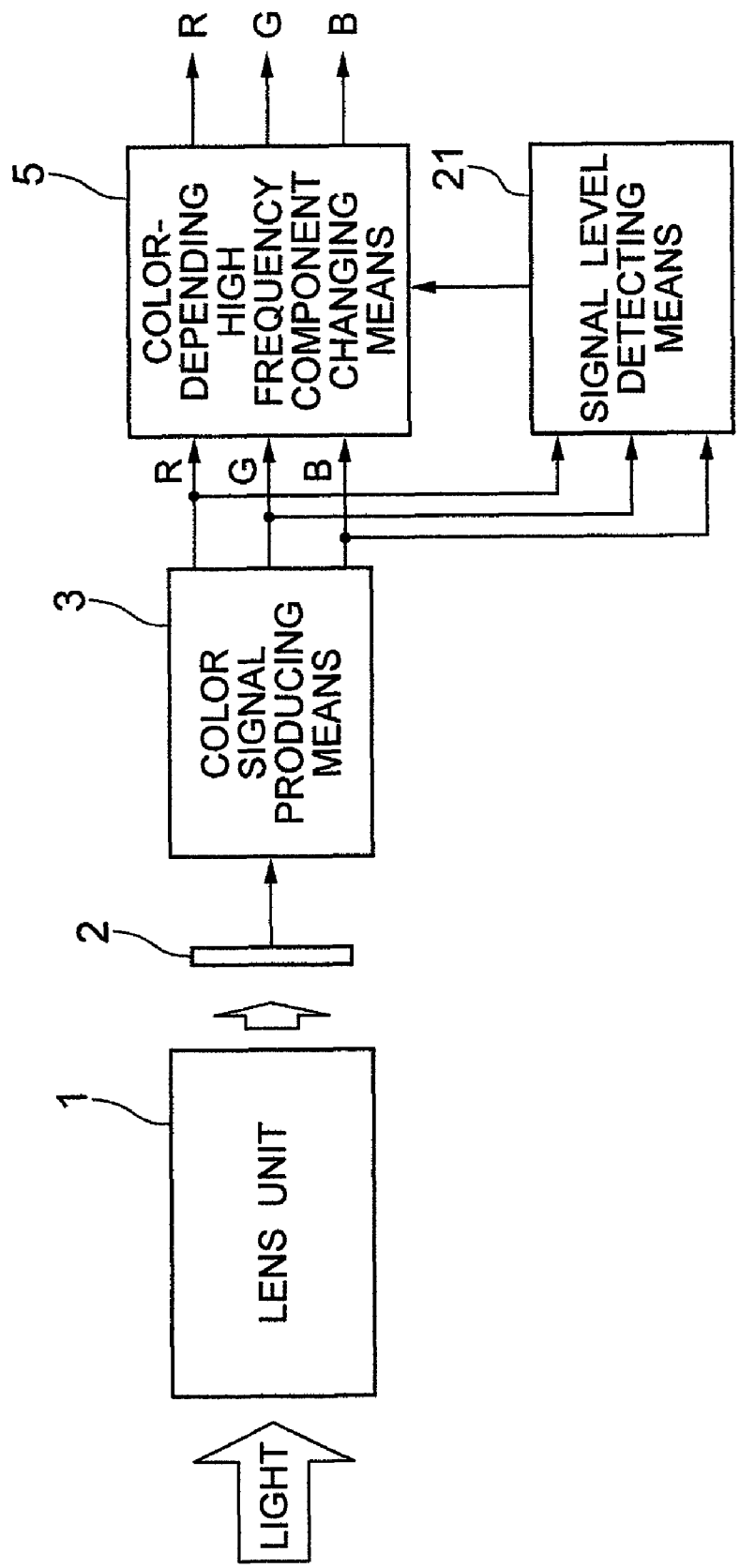
FIG. 6 is a block diagram for schematically showing a structure of an imaging apparatus according to a third embodiment of the present invention.
Figure 7:
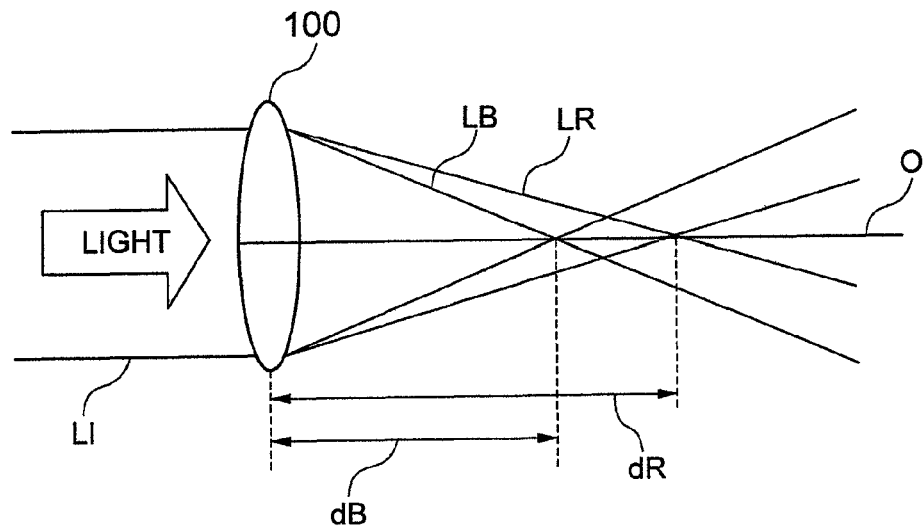
FIG. 7 is a diagram for representing the outline of axial chromatic aberration which occurs in the lens unit.
Figure 8:
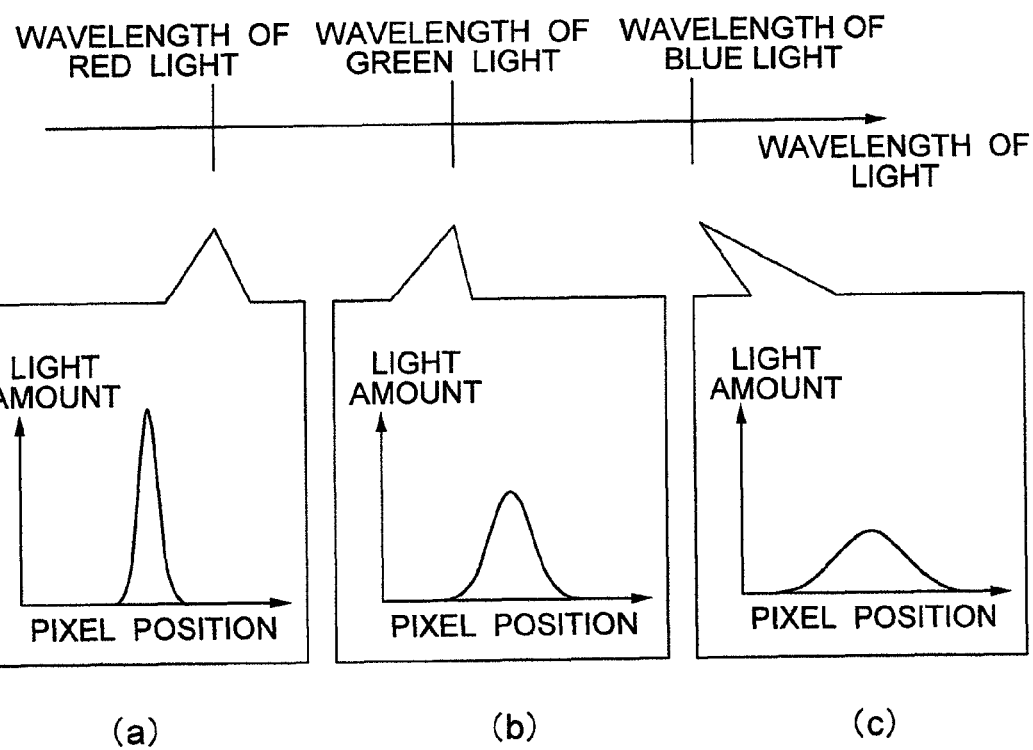
FIG. 8 is explanatory diagrams for explaining false colors and chromatic blur at edge portions, which are caused by the axial chromatic aberration of the lens unit shown in FIG. 7.

FIG. 6 is a block diagram for schematically showing a structure of an imaging apparatus according to a third embodiment of the present invention. In FIG. 6, reference numeral 21 shows a signal level detecting means. It should be noted that the same reference numerals shown in FIG. 1 will be employed for denoting the same structural elements in FIG. 6, and therefore, the same descriptions thereof will be omitted.

In this drawing, R, G, B signals of 3 primary colors outputted from the color signal producing means 3 are supplied to the color-depending high frequency component changing means 5, and further, to the signal level detecting means 21.

The signal level detecting means 21 calculates each of averaged levels with respect to each of the R signal, the G signal, and the B signal. Also, the signal level detecting means 21 extracts high frequency components from the respective R, G, B color signals, and then, detects levels of these extracted high frequency components, and thereafter, calculates gains of these high frequency components in such a manner that a ratio of these high frequency components is made equal to a ratio of these averaged levels as to the R, G, B color signals. For instance, assuming now that levels of the R signal, the G signal, and the B signal are defined as "$R_L$", "$G_L$", and "$B_L$", the signal level detecting means 21 calculates a gain as to each of the high frequency components of the R signal, the G signal, and the B signal in such a manner that a ratio of levels of the high frequency components of the R, G, B signals is made equal to such a ratio of "$R_L:G_L:B_L$." Under such a circumstance, assuming now that a level as to each of the high frequency components of the R, G, B signals is defined as "$R_{HL}$", "$G_{HL}$", and "$B_{HL}$", gains "$AG_R$", "$AG_G$", "$AG_B$" with respect to the high frequency components of the R, G, B signals are calculated as follows, assuming also that symbol "k" is a constant:

$$AG_R = k \times R_L/R_{HL}$$

$$AG_G = k \times G_L/G_{HL}$$

$$AG_B = k \times B_L/B_{HL}$$

It should be understood that, for example, when the imaging element 2 has been arranged in such a manner that this imaging element 2 is just focused onto a green color component of a photographing object image, if the gain "$AG_G$" with respect to the high frequency component of the G signal assumed as 1, then the remaining gains "$AG_R$" and "$AG_B$" are calculated as follows:

$$AG_R = (R_L/R_{HL}) \times (G_{HL}/G_L)$$

$$AG_B = (B_L/B_{HL}) \times (G_{HL}/G_L)$$

It should be also understood that, for example, when the imaging element 2 has been arranged in such a manner that this imaging element 2 is just focused onto a red color component of the photographing object image, if the gain "$AG_R$" with respect to the high frequency component of the R signal is assumed as 1, then the remaining gains "$AG_G$" and "$AG_B$" are calculated as follows:

$$AG_G = (G_L/G_{HL}) \times (R_{HL}/R_L)$$

$$AG_B = (B_L/B_{HL}) \times (R_{HL}/R_L)$$

It should further understood that, for example, when the imaging element 2 has been arranged in such a manner that this imaging element 2 is just focused onto a blue color component of the photographing object image, if the gain "$AG_B$" with respect to the high frequency component of the B signal is assumed as 1, then the remaining gains "$AG_R$" and "$AG_G$" are calculated as follows:

$$AG_R = (R_L/R_{HL}) \times (B_{HL}/B_L)$$

$$AG_G = (G_L/G_{HL}) \times (B_{HL}/B_L)$$

Accordingly, in any case, the color signals are processed based upon the relevant gains, so that the resulting ratio of the high frequency components of the R signal, the G signal, and the B signal is given as follow:

$$R_L : G_L : B_L$$

As previously described, the gain information "$AG_R$", "$AG_G$", and "$AG_B$" of the high frequency components capable of suppressing the false colors and the chromatic blur at the edge portions can be obtained, which are caused by the axial chromatic aberration of the lens unit 1. The color-depending high frequency component changing means 5 acquires the gain information "$AG_R$", "$AG_G$", "$AG_B$" of the R, G, B signals which have been acquired by the signal level detecting means 21 time to time, and thus, corrects especially the high frequency component in the process for correcting the frequency characteristic with respect to each of the R signal, the G signal, and the B signal in a similar manner to that of the first embodiment shown in FIG. 1.

Similar to the previously explained first embodiment, in this third embodiment, the false colors and the chromatic blur at the edge portions can be suppressed in the above-described manner, which are caused by the axial chromatic aberration of the lens unit 1, and the deterioration of the resolution can be suppressed, while the color reproducibility is not deteriorated. Also, the axial chromatic aberration of the lens unit 1 which changes time to time is detected in real time so as to correct the frequency characteristic of the high frequency component. As a result, more specifically, the below-mentioned process operation explained in the first embodiment is no longer required in this third embodiment. That is, in this process operation, the information used to correct the attenuations of the high frequency components, which are caused by the axial chromatic aberration of the lens unit 1, has been previously measured. As a result, it is possible to reduce workloads when the imaging apparatus according to the present invention is developed, or is manufactured in a factory.

In the above-described example, in the signal level detecting means 21, the respective high frequency components have been extracted every R signal, G signal, and B signal, and the levels of these extracted high frequency components have be detected. This may be realized by providing, for instance, the result of the high-pass filter such as an HPF 7 as the high frequency components.

Also, in this example, in the signal level detecting means 21, the respective averaged levels have been detected every R signal, G signal, and B signal; and further, the respective high frequency components have been extracted, and thus, the levels thereof have been calculated. This process operation may also be realized in such a manner that while such a frequency analyzing filter as an Hadamard's transform filter, a DCT transform filter, and a DST transform filer is employed, a low-order component contained in filtered results of this frequency analyzing filter may be utilized as the averaged level, whereas a high-order component contained in the filtered results thereof may be utilized as the high frequency component.

Also, similar to the previous embodiments, if the color-depending high frequency component changing means 5 is arranged in the form of such a structure shown in FIG. 3A and the calculated gain information "$AG_R$", "$AG_G$", and "$AG_B$" are set thereto, then the false colors and the chromatic blur at the edge portions of the image can be suppressed which are caused by the axial chromatic aberration of the lens unit 1, and also, the deterioration of the resolution can be improved, while the color reproducibility is not deteriorated.

Also, similar to the previous embodiments, in such a case that the color-depending high frequency component changing means 5 may be alternatively arranged by a color-depending edge judging unit and an edge correcting unit, while the color-depending edge judging unit judges/detects an edge portion with respect to each of the R signal, the G signal, and the B signal, and also, the edge correcting unit performs an edge correction based upon a judgement result obtained from the color-depending edge judging unit, only such a portion may be corrected in which a deterioration of an image quality may conspicuously appear. This image quality deterioration is caused by the false color and the chromatic blur at the edge portion, and the deterioration in the resolution, which are caused by the axial chromatic aberration. As a result, power consumption may also be lowered than power consumption when the corrections are continuously made.

Also, in this example, as to the R, G, B signals of the three primary colors, the signal levels of the high frequency components thereof have been changed. Alternatively, the levels of the R, G, B signals of the 3 primary colors need not be changed in the present invention. If the below-mentioned alternative arrangement can be realized, then this alternative arrangement may be alternatively employed. For instance, similar to the previous embodiments, the color signal producing means 3 is designed so as to produce the yellow color signal corresponding to the wavelength between the R signal and the G signal, and the cyan color signal corresponding to the wavelength between the B signal and the G signal in addition to the R signal, the G signal, and the B signal. In the signal level detecting means 6, with respect to 5 sorts of these color signals, each of averaged levels may be calculated, and also respective high frequency components thereof may be extracted so as to detect levels thereof. In the color-depending high frequency component changing means 5, the signal levels of the respective high frequency components may be changed. As a consequence, it is possible to correct deteriorations in image qualities caused by false colors and chromatic blur at edge portions, and deteriorations of resolution due to the axial chromatic aberration of the lens unit 1. Moreover, the R signal, the G signal, the B signal, the yellow signal, and the cyan signal may be precisely corrected every narrower wavelength of light, as compared with that of such a case that the signal levels of the high frequency components are changed with respect to the R signal, the G signal, and the B signal.

Moreover, similar to the previous embodiments, if the imaging apparatus may be alternatively arranged by additionally employing a luminance signal producing means (not shown) for producing a luminance signal based upon the signal derived from the color-depending high frequency component changing means 5, then a resolution deterioration of luminance at the edge portion may be alternatively suppressed which is caused by the axial chromatic aberration of the lens unit 1.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. In an imaging apparatus comprising: a lens unit;
    color imaging means for separating incident light entered from said lens unit every wavelength of the incident light in a spectral manner and for photoelectrically converting the separated incident light into signals; and
    color signal producing means for producing a plurality of color signals based upon said signals derived from said color imaging means,
    said imaging apparatus is further comprised of:
    color-depending high frequency component changing means for individually correcting signal amounts with respect to the signals derived from said color imaging means, or the color signals produced from said color signal producing means in such a manner that high frequency components thereof become predetermined correction amounts.

2. In an imaging apparatus comprising: a lens unit; color imaging means for separating incident light entered from said lens unit every wavelength of the incident light in a spectral manner and for photoelectrically converting the separated incident light into signals; and color signal producing means for producing a plurality of color signals based upon
    said signals derived from said color imaging means,
    said imaging apparatus is further comprised of:
    signal level detecting means for detecting a difference in signal levels with respect to the signals derived from said color imaging means, or the color signals produced from said color signal producing means; and
    color-depending high frequency component changing means for individually correcting signal amounts of high frequency components with respect to the signals derived from said color imaging means, or the color signals produced from said color signal producing means based upon a level detection result of said signal level detecting means.

3. An imaging apparatus as claimed in claim 1, further comprising:
    information holding means for holding information about said predetermined information amounts.

4. An imaging apparatus as claimed in claim 1 wherein:
    said lens unit has a focus lens;
    said imaging apparatus is further comprised of:
    a focus lens driving unit for driving said focus lens; and
    a focal length control unit for adjusting a position of said focus lens so as to perform a focusing control thereof with respect to a photographing object, and for outputting focal length information, or positional information of said focus lens as optical condition information related to said focus lens; and wherein:
    said color-depending high frequency component changing means changes amounts of said individually correcting based upon the optical condition information related to said focus lens.

5. An imaging apparatus as claimed in claim 2 wherein:
    said lens unit has a focus lens;
    said imaging apparatus is further comprised of:
    a focus lens driving unit for driving said focus lens; and
    a focal length control unit for adjusting a position of said focus lens so as to perform a focusing control thereof with respect to a photographing object, and for outputting focal length information, or positional information of said focus lens as optical condition information related to said focus lens; and wherein:
    said color-depending high frequency component changing means changes amounts of said individually correcting based upon the optical condition information related to said focus lens.

6. An imaging apparatus as claimed in claim 1 wherein:
    said lens unit has a zoom lens;
    said imaging apparatus is further comprised of:
    a zoom lens driving unit for driving said zoom lens; and
    an optical zooming control unit for adjusting a position of said zoom lens so as to perform an optical zooming control for changing optical magnification; and wherein:
    said color-depending high frequency component changing means changes said correction amounts based upon the optical condition information related to said zoom lens.

7. An imaging apparatus as claimed in claim 2 wherein:
    said lens unit has a zoom lens;
    said imaging apparatus is further comprised of:
    a zoom lens driving unit for driving said zoom lens; and
    an optical zooming control unit for adjusting a position of said zoom lens so as to perform an optical zooming control for changing optical magnification; and wherein:
    said color-depending high frequency component changing means changes said correction amounts based upon the optical condition information related to said zoom lens.

8. An imaging apparatus as claimed in claim 1 wherein:
    said lens unit has an iris;
    said imaging apparatus is further comprised of:
    an iris driving unit for driving said iris; and
    an iris control unit for controlling said iris driving unit and for outputting light attenuation amount information, or open/close information about said iris as optical condition information related to said iris; and wherein:

said color-depending high frequency component changing means changes amounts of said individually correcting based upon the optical condition information related to said iris.

9. An imaging apparatus as claimed in claim 2 wherein:
said lens unit has an iris;
said imaging apparatus is further comprised of:
an iris driving unit for driving said iris; and
an iris control unit for controlling said iris driving unit and for outputting light attenuation amount information, or open/close information about said iris as optical condition information related to said iris; and wherein:
said color-depending high frequency component changing means changes amounts of said individually correcting based upon the optical condition information related to said iris.

10. An imaging apparatus as claimed in claim 2 wherein:
said signal level detecting means extracts high frequency components by operating a high-pass filter with respect to the signals derived from said color imaging means, or the color signals produced from said color signal producing means, and compares the extracted high frequency components with each other.

11. An imaging apparatus as claimed in claim 2 wherein:
said signal level detecting means extracts a plurality of frequency components by employing a frequency analyzing filter with respect to the signals derived from said color imaging means, or the color signals produced from said color signal producing means, and compares the extracted frequency components with each other.

12. An imaging apparatus as claimed in claim 2 wherein:
said signal level detecting means calculates a difference value of signal levels with respect to the signals derived from said color imaging means, or the color signals produced from said color signal producing means so as to compare the difference values with each other.

13. An imaging apparatus as claimed in claim 1 wherein:
individually changing of signal amounts by said color-depending high frequency component changing means implies individually changing of the signal amounts in such a manner that the high frequency components are increased.

14. An imaging apparatus as claimed in claim 2 wherein:
individually changing of signal amounts by said color-depending high frequency component changing means implies individually changing of the signal amounts in such a manner that the high frequency components are increased.

15. An imaging apparatus as claimed in claim 13 wherein:
when the color-depending high frequency component changing means individually changes the signal amounts in such a manner that the high frequency components are increased, said color-depending high frequency component changing means increases the high frequency components in such a manner that a gain difference of the high frequency components every signal derived from said color imaging means, or every color signal produced from said color signal producing means becomes small.

16. An imaging apparatus as claimed in claim 14 wherein:
when the color-depending high frequency component changing means individually changes the signal amounts in such a manner that the high frequency components are increased, said color-depending high frequency component changing means increases the high frequency components in such a manner that a gain difference of the high frequency components every signal derived from said color imaging means, or every color signal produced from said color signal producing means becomes small.

17. An imaging apparatus as claimed in claim 13 wherein:
when the color-depending high frequency component changing means individually changes the signal amounts in such a manner that the high frequency components are increased, said color-depending high frequency component changing means increases the high frequency components in such a manner that a gain difference of the high frequency components every signal derived from said color imaging means, or every color signal produced from said color signal producing means becomes large.

18. An imaging apparatus as claimed in claim 14 wherein:
when the color-depending high frequency component changing means individually changes the signal amounts in such a manner that the high frequency components are increased, said color-depending high frequency component changing means increases the high frequency components in such a manner that a gain difference of the high frequency components every signal derived from said color imaging means, or every color signal produced from said color signal producing means becomes large.

19. An imaging apparatus as claimed in claim 1 wherein:
individually changing of signal amounts by said color-depending high frequency component changing means implies individually decreasing of the high frequency components in such a manner that a gain difference of the high frequency components every signal derived from said color imaging means, or every color signal produced from said color signal producing means becomes large.

20. An imaging apparatus as claimed in claim 2 wherein:
individually changing of signal amounts by said color-depending high frequency component changing means implies individually decreasing of the high frequency components in such a manner that a gain difference of the high frequency components every signal derived from said color imaging means, or every color signal produced from said color signal producing means becomes large.

21. An imaging apparatus as claimed in claim 1 wherein:
individually changing of signal amounts by said color-depending high frequency component changing means implies changing of signal amounts in such a manner that an edge portion of a signal waveform becomes steep, or changing of signal amounts in such a manner that a stepped portion of the edge portion of the signal waveform becomes large.

22. An imaging apparatus as claimed in claim 2 wherein:
individually changing of signal amounts by said color-depending high frequency component changing means implies changing of signal amounts in such a manner that an edge portion of a signal waveform becomes steep, or changing of signal amounts in such a manner that a stepped portion of the edge portion of the signal waveform becomes large.

23. An imaging apparatus as claimed in claim 1 wherein:
said color imaging means is constructed of a single plate color imaging element in which pixels having at lest two sorts of color filters have been arranged; and wherein:
said color signal producing means produces said color signals by performing an interpolating process with respect to the signals derived from said single plate color imaging element.

24. An imaging apparatus as claimed in claim 2 wherein:
said color imaging means is constructed of a single plate color imaging element in which pixels having at lest two sorts of color filters have been arranged; and wherein:
said color signal producing means produces said color signals by performing an interpolating process with respect to the signals derived from said single plate color imaging element.

25. An imaging apparatus as claimed in claim 1 wherein:
said color imaging means is constructed of a single plate color imaging element in which pixels having at lest two sorts of color filters have been arranged; and wherein:
said color signal producing means produces said color signals by performing a matrix calculating process with respect to the signals derived from said single plate color imaging element.

26. An imaging apparatus as claimed in claim 2 wherein:
said color imaging means is constructed of a single plate color imaging element in which pixels having at lest two sorts of color filters have been arranged; and wherein:
said color signal producing means produces said color signals by performing a matrix calculating process with respect to the signals derived from said single plate color imaging element.

27. An imaging apparatus as claimed in claim 1 wherein:
said color imaging means is arranged by a prism for separating the incident light entered from said lens unit every wavelength of the incident light, and at least two pieces of imaging elements for photoelectrically converting said separated incident light, respectively; and wherein:
said color signal producing means produces said color signals by performing a matrix calculating process with respect to the signals derived from said color imaging element.

28. An imaging apparatus as claimed in claim 2 wherein:
said color imaging means is arranged by a prism for separating the incident light entered from said lens unit every wavelength of the incident light, and at least two pieces of imaging elements for photoelectrically converting said separated incident light, respectively; and wherein:
said color signal producing means produces said color signals by performing a matrix calculating process with respect to the signals derived from said color imaging element.

29. An imaging apparatus as claimed in claim 1 wherein:
said a plurality of color signals are an R(red) signal, a G(green) signal and a B(blue) signal of three primary colors.

30. An imaging apparatus as claimed in claim 2 wherein:
said a plurality of color signals are an R(red) signal, a G(green) signal and a B(blue) signal of three primary colors.

31. An imaging apparatus as claimed in claim 1 wherein:
said a plurality of color signals are an R(red) signal, a G(green) signal and a B(blue) signal of three primary colors, and also, a yellow signal having a wavelength between the R signal and the G signal, and further, a cyan signal having a wavelength between the G signal and the B signal.

32. An imaging apparatus as claimed in claim 2 wherein:
said a plurality of color signals are an R(red) signal, a G(green) signal and a B(blue) signal of three primary colors, and also, a yellow signal having a wavelength between the R signal and the G signal, and further, a cyan signal having a wavelength between the G signal and the B signal.

33. An imaging apparatus as claimed in claim 1, further comprising:
luminance signal producing means for producing a luminance signal by employing the signals derived from said color-depending high frequency component changing means.

34. An imaging apparatus as claimed in claim 2, further comprising:
luminance signal producing means for producing a luminance signal by employing the signals derived from said color-depending high frequency component changing means.

* * * * *